No. 772,874.

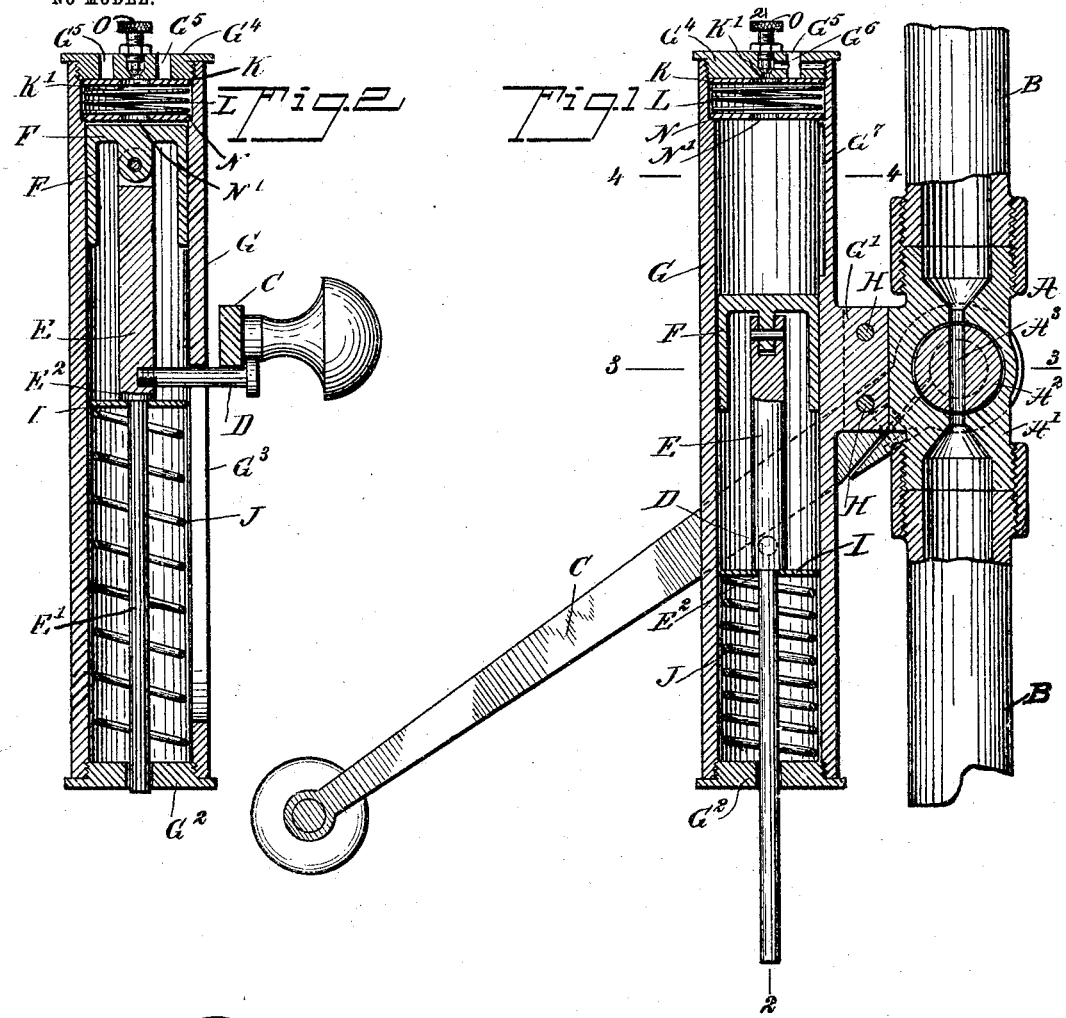

Patented October 18, 1904.

UNITED STATES PATENT OFFICE.

AUGUSTUS FRANCIS DONALDSON, OF MANSFIELD, OHIO.

VALVE-CONTROLLING DEVICE.

SPECIFICATION forming part of Letters Patent No. 772,874, dated October 18, 1904.

Application filed December 26, 1902. Serial No. 136,643. (No model.)

*To all whom it may concern:*

Be it known that I, AUGUSTUS FRANCIS DONALDSON, a citizen of the United States, and a resident of Mansfield, in the county of Richland and State of Ohio, have invented a new and Improved Valve-Controlling Device, of which the following is a full, clear, and exact description.

The invention relates to means for controlling valves to govern the amount of water or other liquid passing through the valve.

The object of the invention is to provide a new and improved valve-controlling device which is simple and durable in construction, very effective in operation, easily adjusted, and arranged to insure a rapid closing of the valve after the desired amount of liquid has passed through the valve.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement. Fig. 2 is a transverse section of the same on the line 2 2 of Fig. 1. Fig. 3 is a sectional plan view of the same on the line 3 3 of Fig. 1, and Fig. 4 is an inverted sectional plan view of the improvement on the line 4 4 of Fig. 1.

The valve A to be controlled is arranged in a pipe-line B and is provided with a suitable valve-body A', in which is mounted to turn the valve-plug $A^2$, having a diametrical passage $A^3$ for connecting the inlet of the pipe-line B with the outlet thereof, as will be readily understood by reference to Fig. 1. On the stem $A^4$ of the valve-plug $A^2$ is secured a hand-lever C, under the control of the operator and engaged by a pin D, projecting transversely from a piston-rod E, pivotally connected with a piston F, mounted to slide in a cylinder G, having a lug G' secured to a lug $A^5$, integral on the valve-body A', as plainly shown in Fig. 3, the said lugs G' and $A^5$ being fastened together by suitable fastening devices, such as screws H.

The lower end E' of the piston-rod E is somewhat reduced to form a shoulder $E^2$, against which abuts a disk I, pressed on by the upper end of a spring J, resting at its lower end on a cylinder-head $G^2$, secured to the lower end of the cylinder G. The pin D, previously mentioned, extends through an elongated slot $G^3$, formed in one side of the cylinder G, so that the pin D can move up and down in the slot to move the piston F in the same direction—that is, when the operator swings the hand-lever C downward to open the valve, as shown in Fig. 1, then the pressure of the hand-lever C on the pin D causes a downward sliding of the piston-rod E and its piston F to compress the spring J and to move the several parts into the position shown in Fig. 1. When the operator releases the pressure on the hand-lever C, then the recoil of the spring J causes an upward movement of the piston-rod E and its piston F, so that the pin D imparts an upward swinging motion to the hand-lever C to close the valve-plug $A^2$ to disconnect the supply end of the pipe-line from the outlet end thereof.

In the upper end of the cylinder G is arranged a valve-controlled air-inlet, permitting easy downward movement of the piston F upon swinging the lever C manually downward, as previously explained, the said valve mechanism also permitting an escape of air from the upper end of the cylinder G on the return or upward movement of the piston F, caused by the action of the spring J, as previously mentioned. The valve mechanism mentioned consists, essentially, of a valve-disk K, having a central aperture K' and normally resting against the under side of the cylinder-head $G^4$, screwed or otherwise fastened in the upper end of the cylinder G. The valve-disk K normally closes a plurality of apertures $G^5$, formed in the head $G^4$, and the said valve-disk is held normally in a closed position by the action of a spring L pressing the valve-disk against the under side of the head $G^4$, as plainly shown in the drawings. The lower end of the spring L rests on a disk N, supported on a shoulder within the cylinder G, and the said disk is provided with a central aperture N' to allow the air to pass into and out of the cylinder between the disks K and N. From one of the apertures G⁵ leads an angular aperture G⁶ to the under side of the head G⁴ to register with the opening K' in the valve-disk K, and this aperture G⁶ is controlled by a valve O, screwing in the upper portion of the cylinder-head G⁴. Now when the piston F is moved downward by the operator imparting a downwardly-swinging motion to the hand-lever C, as previously explained, to open the valve A then air passes into the upper end of the cylinder through the apertures G⁵ and the valve-disk K, which then moves downward against the tension of its spring L. As soon as the piston F reaches its lowermost position, as shown in Fig. 1, then the spring L moves the valve-disk K back to its normal position, as shown in Figs. 1 and 2, and the air from the upper end of the cylinder G can now slowly escape through the apertures N', K', G⁶, and G⁵, to allow slow return movement of the piston F by the action of the spring J, as previously explained. When the piston F nears an uppermost position, then its lower end uncovers an equalizing-groove G⁷, formed on the inside of the cylinder G, in the upper portion thereof, to allow air in the upper end of the cylinder to escape to the lower end thereof, and thus equalize the air-pressure on both sides of the piston, and thereby allow the spring J to quickly push the piston F into its uppermost position and cause a quick closing of the valve-plug A² to shut off the water-supply.

From the foregoing it will be evident that the device is very simple and durable in construction and permits the operator to actuate the hand-lever C in both directions to open and close the valve by hand whenever it is desired to do so, it being, however, understood that the operator usually swings the hand-lever C only to a downward position to allow the spring-pressed piston F to return the hand-lever C, and thus close the valve A after a certain interval to regulate the amount of water passing through the pipe-line. Now by adjusting the valve O the escape of air from the upper end of the cylinder can be readily controlled, and consequently the return movement of the piston F takes place in a longer or shorter time, and the valve A is thereby closed sooner or later. It will further be understood that the cylinder G and the parts contained therein can be readily attached to the valve-body A' or detached therefrom whenever it is desired not to use the device for automatically controlling the return movement of the hand-lever C.

Having thus described my invention, I claim as new and desire to secure by Letters Patent—

1. A controlling device, comprising a cylinder, a spring-pressed piston therein, a valve having a handle for manually turning the valve into and out of a closed position, a connection between the piston and the said handle, to actuate the latter and move the valve from an open into a closed position, and a device for controlling the inlet and outlet of air to and from the said cylinder, to govern the return movement of the piston therein, the said device comprising an apertured valve-disk for opening and closing apertures in the cylinder-head, the said apertures in the cylinder-head being out of register with the aperture in the valve-disk, a spring for holding the valve-disk normally in a closed position, and an adjustable valve in the cylinder-head, for establishing connection between one of the apertures in the cylinder-head and the aperture in the said valve-disk, as set forth.

2. The combination with a valve having a body provided with a lug and a valve-plug mounted to turn in the valve-body, of a cylinder having a lug secured to the lug on the valve-body, a spring-pressed piston in the said cylinder, carrying a pin extending through an elongated slot in the said cylinder, a handle secured to the stem of the valve-plug and engaged by the said pin, and a device for controlling the inlet and outlet of air to and from the said cylinder, as set forth.

3. A controlling device for a valve, comprising a cylinder, a spring-pressed piston therein, a hand-lever on the valve, for turning the latter in either direction and for imparting motion to the piston against the tension of the spring, the said piston imparting a return motion to the hand-lever, to close the valve on the operator releasing the hand-lever, means for retarding the closing of the valve, and means for equalizing the air-pressure on both sides of the piston to allow the spring to quickly push the piston into its uppermost position and thus permit a quick final closing of the valve by the piston and hand-lever, as set forth.

4. In a valve-controlling device, the combination with a valve-body, a valve in said body, and an operating-lever secured to said valve, of a cylinder secured to the valve-body at one side thereof and provided with a longitudinal slot in its lower portion, a spring-pressed piston in the cylinder and provided with a pin projecting out through the slot of the cylinder into the path of the operating-lever to be engaged thereby to move the piston downward against the action of its spring when the hand-lever is operated to open the valve, and a device for controlling the inlet and outlet of air to and from the upper end of the cylinder, as set forth.

5. A valve-controlling device, comprising a cylinder having a longitudinal groove on the inner surface of its upper portion, and with a longitudinal slot in its lower portion, a spring-pressed piston in the cylinder, and provided with a pin projecting through the slot of the cylinder to be loosely engaged by the operating-lever of a valve, and a valve-controlled device at the upper end of said cylinder for controlling the inlet and outlet of air to and from the cylinder, as set forth.

6. A controlling device, comprising a cylinder, a spring-pressed piston in the cylinder, a valve having a handle for manually turning the valve into and out of a closed position, means carried by the piston to be engaged by the handle of the valve when the handle is operated to move the valve from an open to a closed position, means for effecting a rapid closing of the valve, said means consisting of a longitudinal groove on the inside of the cylinder, and a valve in the cylinder-head for controlling the inlet and outlet of air to and from the cylinder to govern the return movement of the piston, as set forth.

In testimony whereof I have signed my name to this specification in the presence of two subscribing witnesses.

AUGUSTUS FRANCIS DONALDSON.

Witnesses:
FRANK F. GERTH,
CHARLES T. EVANS.